United States Patent
Watson et al.

(10) Patent No.: US 10,631,526 B2
(45) Date of Patent: Apr. 28, 2020

(54) SYSTEM AND METHOD FOR AQUARIUM WATER REMOVAL

(71) Applicant: PetSmart Home Office, Inc., Phoenix, AZ (US)

(72) Inventors: Jeffrey Stocker Watson, Phoenix, AZ (US); Gary Steven Chattin, Scottsdale, AZ (US); Guangyu Tan, Shenzhen (CN)

(73) Assignee: PETSMART HOME OFFICE INC., Phoenix, AZ (US)

( * ) Notice: Subject to any disclaimer, the term of this patent is extended or adjusted under 35 U.S.C. 154(b) by 0 days.

(21) Appl. No.: 16/253,458

(22) Filed: Jan. 22, 2019

(65) Prior Publication Data
US 2019/0269108 A1 Sep. 5, 2019

Related U.S. Application Data

(60) Provisional application No. 62/637,728, filed on Mar. 2, 2018.

(51) Int. Cl.
*A01K 63/04* (2006.01)

(52) U.S. Cl.
CPC .......... *A01K 63/045* (2013.01); *A01K 63/042* (2013.01)

(58) Field of Classification Search
CPC ........................... A01K 63/045; A01K 63/042
USPC ............. 210/167.25; 119/259, 260, 261, 262
See application file for complete search history.

(56) References Cited

U.S. PATENT DOCUMENTS

| 4,098,230 | A | | 7/1978 | Jackson | |
|---|---|---|---|---|---|
| 4,988,436 | A | | 1/1991 | Cole | |
| 5,096,576 | A | | 3/1992 | Szabo | |
| 5,098,585 | A | * | 3/1992 | Woltman | A01K 63/045 119/259 |
| 5,693,220 | A | | 12/1997 | Sceusa | |
| 7,537,692 | B1 | | 5/2009 | Hadden | |
| 2016/0235043 | A1 | * | 8/2016 | Sawicki | A01K 63/045 |
| 2019/0166809 | A1 | * | 6/2019 | Yu | A01K 63/045 |

FOREIGN PATENT DOCUMENTS

WO 2018/085856 5/2018

OTHER PUBLICATIONS

Office Action and Examination Search Report dated Feb. 24, 2020 in Canadian Patent Application No. 3,034,173.

* cited by examiner

*Primary Examiner* — Fred Prince
(74) *Attorney, Agent, or Firm* — Fox Rothschild LLP

(57) ABSTRACT

An aquarium including a first water chamber providing a habitat for aquatic species, a second water chamber, wherein the second water chamber is fluidly coupled to the first water chamber, and a third water chamber, wherein the third water chamber is fluidly coupled to the second water chamber. The aquarium also includes a water discharge arrangement housed at least partially within the third water chamber, wherein the water discharge arrangement includes a pump and a discharge outlet coupled to the pump such that water within the third water chamber may discharged from the discharge outlet, and further wherein the discharge outlet is selectively rotatable such that water may be discharged either a) into one of the first water chamber or the third water chamber, or b) out of the aquarium.

28 Claims, 13 Drawing Sheets

SYSTEM AND METHOD FOR AQUARIUM WATER REMOVAL

CROSS-REFERENCE TO RELATED APPLICATIONS

This patent document claims priority to U.S. Provisional Patent Application No. 62/637,728, filed Mar. 2, 2018. The disclosure of the priority application is fully incorporated by reference.

BACKGROUND

The present disclosure relates generally to an aquarium and, more particularly, to a system and method for removing and/or replacing some or all of the water within the aquarium.

Aquariums, or fish tanks, are commonly found in household and business settings, in an array of sizes and configurations. An aquarium generally includes a water-tight vessel having at least one transparent sidewall for viewing, with the vessel being at least partially filled with fresh or saltwater in order to provide a living environment for fish and/or other aquatic species. In some configurations, aquariums are temperature-controlled and/or equipped with air pumps so as to maintain appropriate oxygen levels in the water. Additionally, some aquariums are equipped with one or more water pumps and filters, which act to remove undesirable debris from the water within the aquarium.

In order for the artificial ecosystem formed within an aquarium to remain stable and capable of supporting marine life, debris and waste must be periodically removed from the aquarium, with clean water being added periodically, as well. In many instances, the entire volume of water within the aquarium does not need to be replaced, as replacing only a portion of the water suffices to maintain the cleanliness and stability of the aquatic environment. For example, many manufacturers recommend that at least 25% of the water within the aquarium be changed on a weekly basis in order to maintain a suitable environment for the fish or other species.

To change at least a portion of the water within the aquarium, owners have generally had to rely on either manual methods of removal (e.g., the use of containers and/or hand pumps), or utilize specialized electric pumps configured to remove some or all of the water. While the manual methods are workable, they can be time-consuming and untidy. The use of specialized pumps, on the other hand, adds complication and expense to aquarium ownership. Additionally, in either method, the fish or other species may need to be removed from the aquarium during water change-over, which not only adds complication to the process, but also may stress or injure the fish or other species.

Accordingly, this patent document described devices that are intended to address the issues discussed above and/or other issues.

SUMMARY

In accordance with one aspect of the disclosure, an aquarium is disclosed, the aquarium including a first water chamber providing a habitat for aquatic species. A second water chamber is also provided, wherein the second water chamber is fluidly coupled to the first water chamber. A third water chamber is provided, wherein the third water chamber is fluidly coupled to the second water chamber. Additionally, the aquarium includes a water discharge arrangement housed at least partially within the third water chamber. The water discharge arrangement comprises a pump and a discharge outlet coupled to the pump such that water within the third water chamber may discharged from the discharge outlet. The discharge outlet is selectively rotatable such that water may be discharged either a) into one of the first water chamber or the third water chamber, or b) out of the aquarium.

According to another aspect of the disclosure, a method of removing water from an aquarium is disclosed. The method includes providing an aquarium having a first water chamber, a second water chamber positioned below and fluidly coupled to the first water chamber, and a third water chamber fluidly coupled to the second water chamber, and providing a water discharge arrangement at least partially the third water chamber. The water discharge arrangement includes a pump, and a discharge outlet coupled to the pump such that water within the third water chamber may discharged from the discharge outlet. The method further includes rotating the discharge outlet from a first position in which the discharge outlet discharges water into the first water chamber to a second position in which the discharge outlet discharges water out of the aquarium.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when an aquarium or related component is oriented as shown in the Figures.

Figure 1:
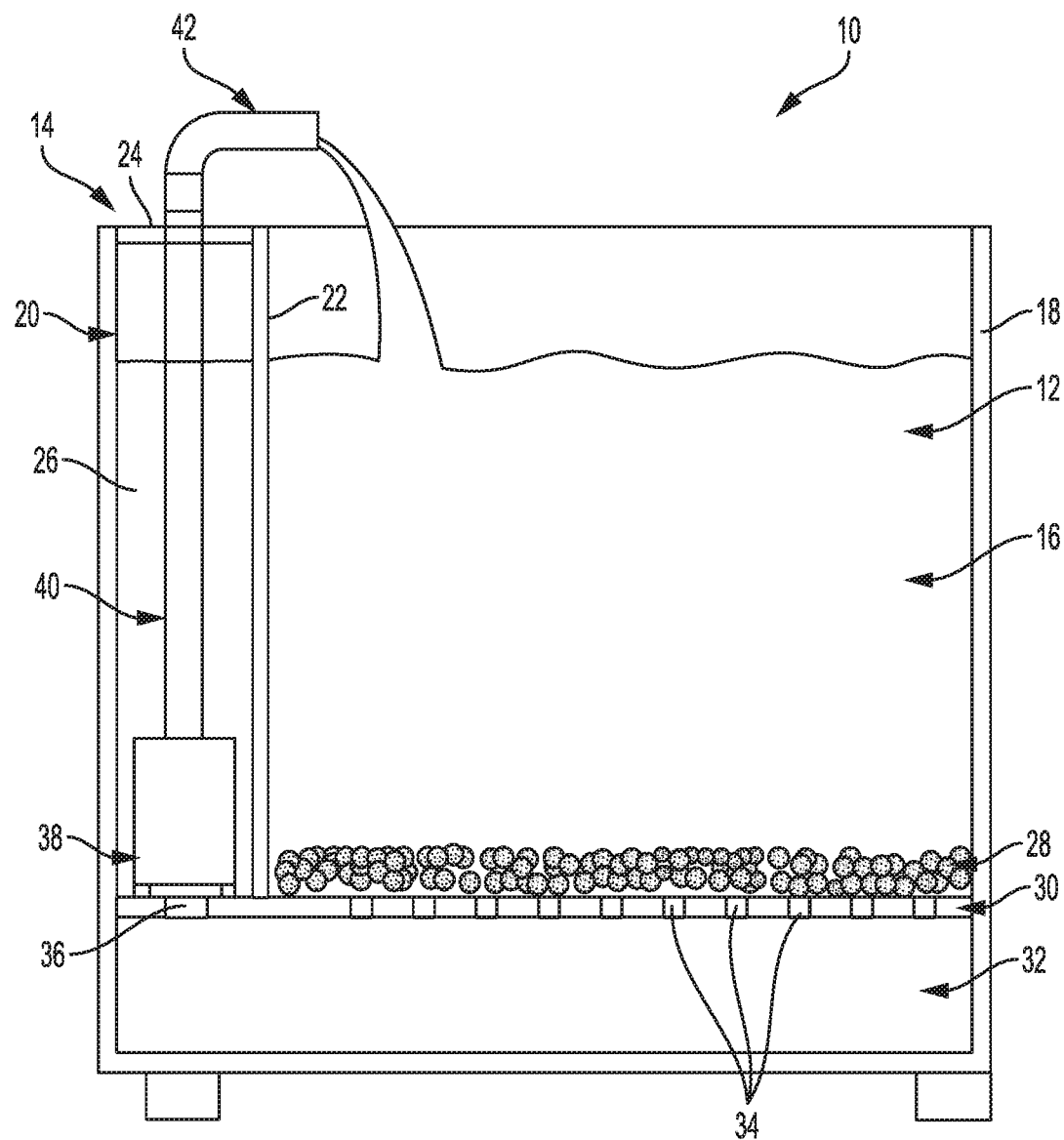
FIG. 1 is a side cross-sectional view of an aquarium in accordance with an aspect of the disclosure.
Figure 2:
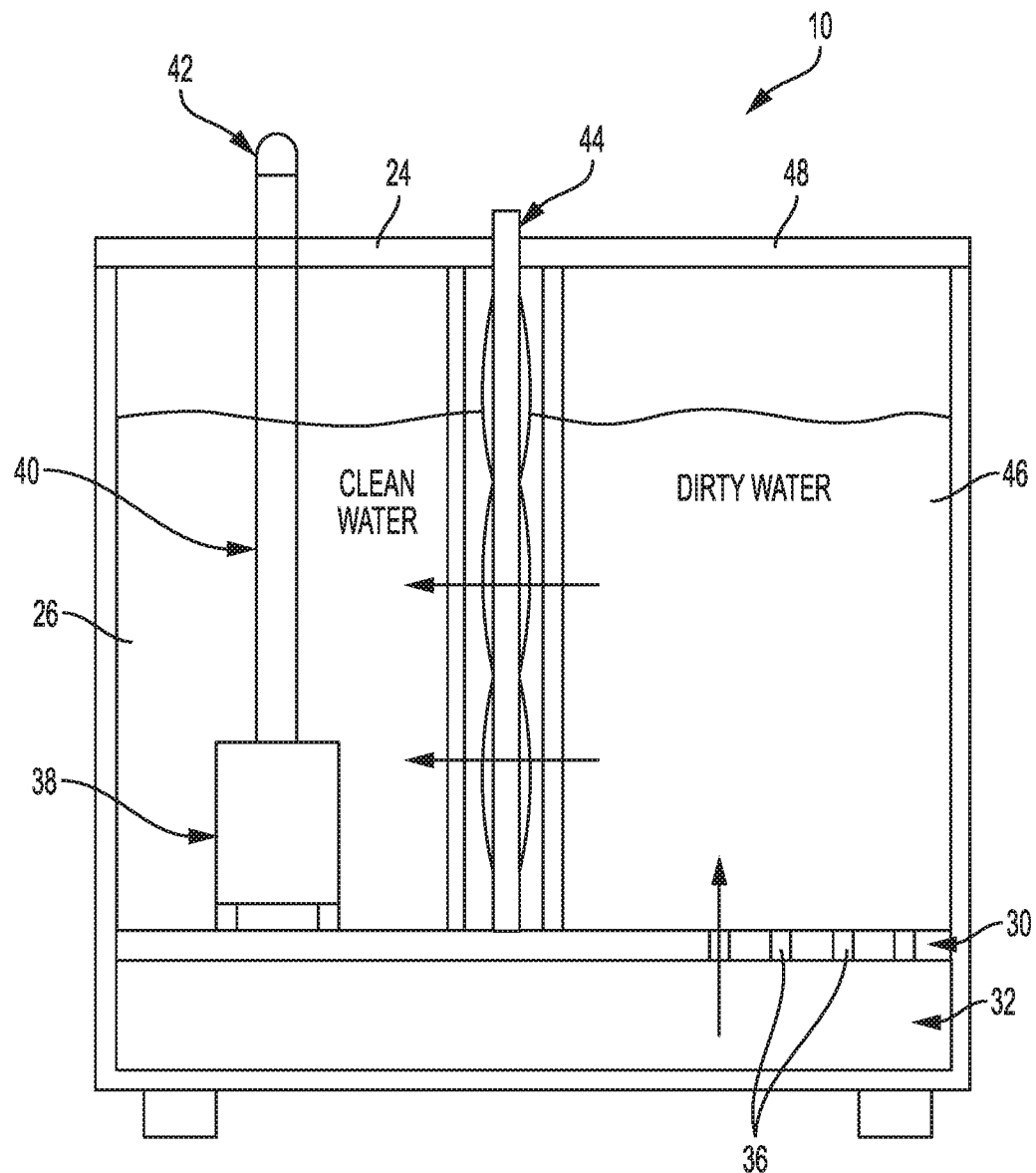
FIG. 2 is a rear cross-sectional view of the aquarium of FIG. 1.

Referring to FIGS. 1-2, respective side and rear cross-sectional views of an aquarium 10 in accordance with an aspect of the disclosure are shown. Specifically, aquarium 10 includes a main water chamber 12, which is configured to hold water 16 and provide a suitable living environment for one or more fish and/or other aquatic species. The aquarium 10 includes a front wall 18, which is preferably clear, but may also be semi-transparent or translucent. Front wall 18 (and/or one or more side walls (not shown)) may be formed of glass or another suitable material such as, e.g., polycarbonate, acrylic, etc. Depending on the species housed within main water chamber 12, the water 16 may be either fresh water or salt water.

The bottom portion of main water chamber 12 is bound by a grate 30, while a rear portion of main water chamber 12 is bound by an inner sidewall 22. Atop grate 30 lies a layer of gravel 28 or other porous medium, with the gravel 28 serving as a substrate for the living environment within main water chamber 12. Below gravel 28 are a plurality of openings 34 within grate 30, with openings 34 being configured to allow water from main water chamber 12 to travel through the gaps in gravel 28 and into an undergravel water chamber 32. The openings 34 are sized so as to allow for the flow of water therethrough and into the undergravel water chamber 32, while still being small enough so as to prevent gravel 28 from becoming trapped in the openings 34 or passing through the openings 34 and into the undergravel water chamber 32.

Opposite inner sidewall 22 from main water chamber 12 is a water discharge arrangement 14. Like main water chamber 12, water discharge arrangement 14 is in fluid communication with undergravel water chamber 32. As shown in FIG. 2, "dirty" water from the main water chamber 12 that has entered the undergravel water chamber 32 through openings 34 is capable of then entering third water chamber through one or more openings 36, with the third water chamber being comprised of a dirty water chamber 46 and a clean water chamber 26. A filter 44 separates the dirty water chamber 46 from the clean water chamber 26, with dirty water chamber 46 having a first cover 48 and clean water chamber 26 having a second cover 24. While shown as separate covers, it is to be understood that first cover 48 and second cover 24 may be formed as a single cover. Filter 44 may be any suitable aquatic filter, such as a tightly-woven screen, a porous media filter, etc. In some embodiments, filter 44 may be removable and/or replaceable.

In order to draw the water from the dirty water chamber 46, through filter 44, and into clean water chamber 26, a pump 38 is disposed within (or near) the clean water chamber 26. Pump 38 may be any appropriate fluid pump, such as a submersible pump. However, pump 38 is not necessarily limited to the configuration shown in FIGS. 1-2, and could be configured as, e.g., an inline pump external to the clean water chamber 26.

As the water is drawn through filter 44 into clean water chamber 26 by pump 38, larger contaminants become caught in filter 44, thereby providing filtered water within clean water chamber 26. The filtered water is then drawn by pump 38 into and through a tube arrangement 40 and to a discharge outlet 42, where it is then discharged back into the main water chamber 12, as illustrated in FIG. 1. In this way, water within main water chamber 12 may be continuously or intermittently cycled through filter 44, providing for increased water clarity and oxygenation, as well as reduced levels of bacteria, nitrates, and other undesirable toxins.

While the filtration of water through filter 44 as described above does reduce various impurities in the water, it is still advisable for at least a portion of the water (e.g., 25%) within aquarium 10 to be removed and replaced on a semi-regular basis in order to introduce clean water free from bacteria, nitrates, and other undesirable toxins into the main water chamber 12. As described above, previous methods of removing water from the main water chamber of aquariums having included the use of large containers or hand pumps, which are generally untidy and difficult to control.

Figure 3:
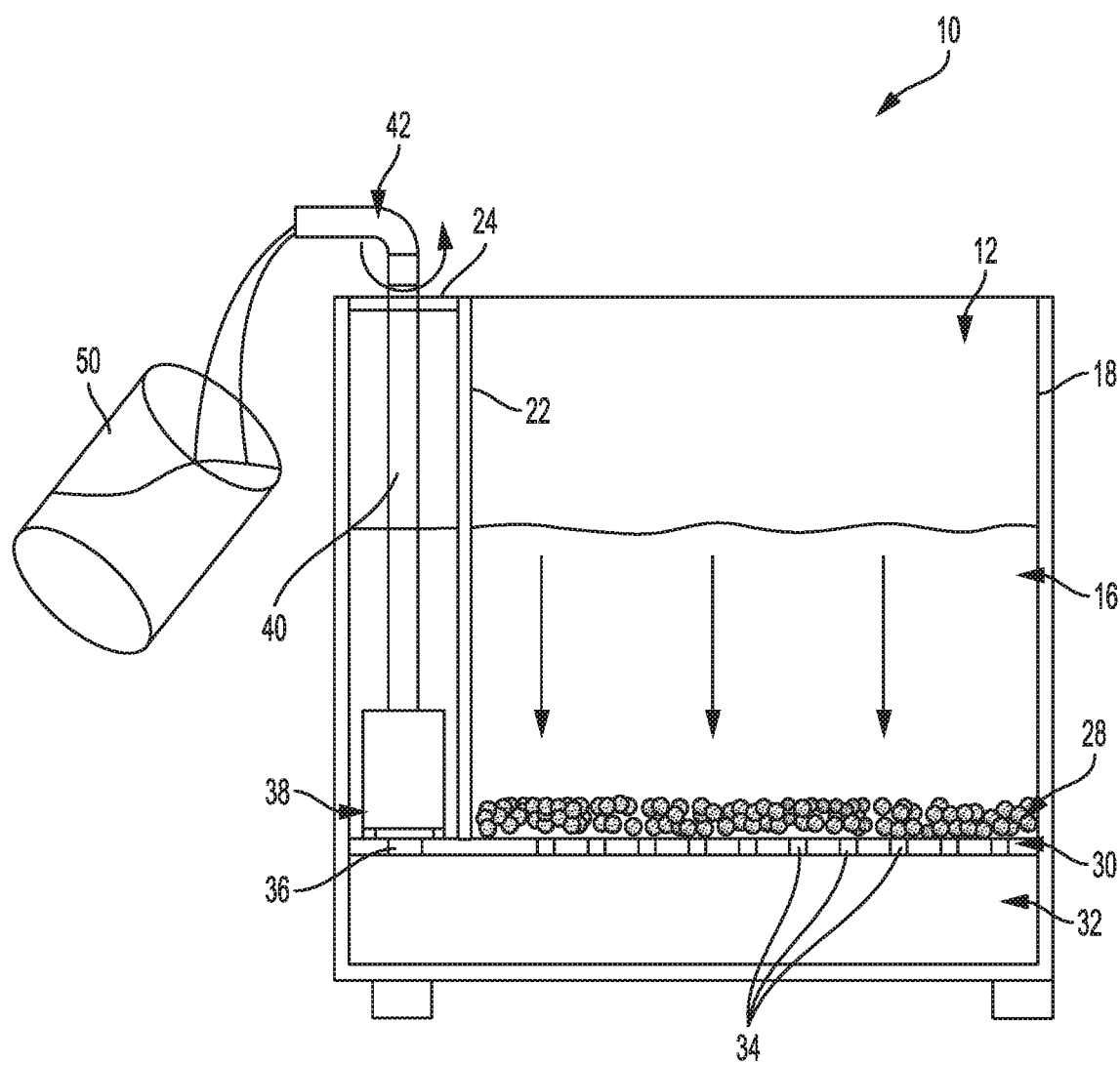
FIG. 3 is a side cross sectional view of the aquarium of FIG. 1 in accordance with another aspect of the disclosure.

Aquarium 10, on the other hand, incorporates a feature in water discharge arrangement 14 which allows for the removal of some or all of the water from within the aquarium 10 without the need for a user to manually remove water from main water chamber 12. Referring to FIG. 3, discharge outlet 42 is shown as being pivotable and/or rotatable relative to main water chamber 12. Thus, as opposed to drawing water through pump 38 and discharging filtered water back in to the main water chamber 12 (as shown in FIGS. 1-2), discharge outlet 42 is configured to be rotated a certain amount (e.g., 90°, 180°, etc.) relative to the main water chamber 12 such that the water drawn through tube arrangement 40 is discharged from discharge outlet 42 in a direction external to aquarium 10. The user may then collect the discharged water in a receptacle 50 or other container (e.g., a water-tight bag, a sink, etc.) for disposal, and clean water can be reintroduced into main water chamber 12 in order to replace the water discharged into receptacle 50. While not shown in FIG. 3, it is to be understood that the user may attach a hose or other extension to rotated discharge outlet 42 in order to more easily collect the discharged water from discharge outlet 42. Furthermore, the amount of rotation of discharge outlet 42 is not limited to the 180° shown. For example, discharge outlet 42 could be limited to rotate less than 180° (e.g., 90°), allowed to rotate more than 180°, or even allowed to rotate unrestricted a full 360°. Additionally, the size and/or shape of discharge outlet 42 is not limited to that which is shown in FIG. 3, and may be any appropriate size and/or shape capable of discharging water.

Thus, with the configuration shown in FIG. 3, the user may utilize many of the existing components of the water filtration system (e.g., the pump, outlet, etc.) in order to simplify the removal of water from the aquarium 10 during their regular water replacement routine.

Figure 4A:
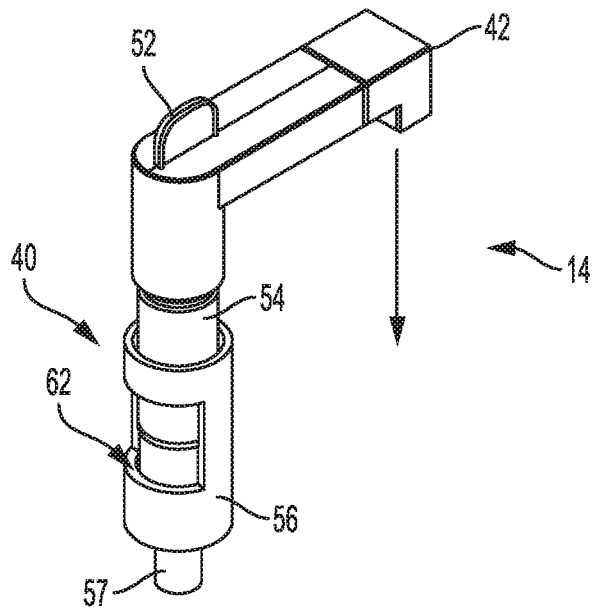
FIG. 4A is a top perspective view of a water discharge arrangement in a first configuration in accordance with an aspect of the disclosure.

Next, referring to FIGS. 4A-4D, a detailed view of water discharge arrangement 14 in accordance with various embodiments of the disclosure is shown. As described above with respect to FIGS. 1-3, water discharge arrangement 14 includes a rotatable discharge outlet 42 extending from a tube 40 arrangement through second cover 24. While not shown in FIGS. 4A-4D, tube arrangement 40 is configured to be fluidly coupled to a pump, which is configured to draw water from within the aquarium through tube arrangement 40 to be discharged from discharge outlet 42. FIG. 4A shows water discharge arrangement 14 in its conventional discharge configuration, wherein the water discharged from discharge outlet 42 would be entering the main water chamber of the aquarium, either directly (as shown in FIG. 1) or indirectly (as will be described in further detail below in view of FIGS. 7-12). Tube arrangement 40 is shown as being configured as a telescopic tube, with a smaller diameter top portion 54 at least partially surrounded by a larger-diameter bottom portion 56. In this way, top portion 54 is capable of sliding vertically and rotating relative to bottom portion 56. It is to be understood that tube arrangement 40 may be configured in other ways, including, e.g., top portion 54 being larger in diameter than bottom portion 56, etc.

A coupling interface 57 may extend from a lower end of bottom portion 56, with coupling interface 57 being sized and configured to accept, e.g., a flexible hose (not shown) thereon or therein, with the flexible hose extending between the pump (not shown) and the tube arrangement 40 so as to enable water to flow from the pump to the tube arrangement 40. By utilizing a flexible hose, the size of aquarium and/or placement of components such as the pump may be varied, while still utilizing the same water discharge arrangement 14. However, in alternative embodiments, water discharge arrangement 14 may be coupled to the pump via a fixed, non-flexible tube.

Bottom portion 56 of tube arrangement 40 includes an opening 62 formed along a surface thereof. While opening 62 is illustrated as extending along approximately one half of the surface of bottom portion 62, it is to be understood that opening 62 may be larger or smaller than that which is shown in FIGS. 4A-4D. In the conventional discharge configuration shown in FIG. 4A, opening 62 is blocked by the top portion 54 of tube arrangement 40, thereby allowing water to flow through both the top portion 54 and bottom portion 56 as the water travels to the discharge outlet 42 from the pump (not shown).

Proximate to discharge outlet 42 extends a tab 52. As will be described in further detail below, tab 52 is sized and configured to provide a user with a suitable gripping location such that the user is able to pull discharge outlet 42 (and top portion 54 of tube 40) upward. While a graspable tab 52 is shown, it is to be understood that any suitable extension that allows the user to move discharge outlet 42 may be provided such as, e.g., a loop, a hook, a handle, etc.

Figure 4B:
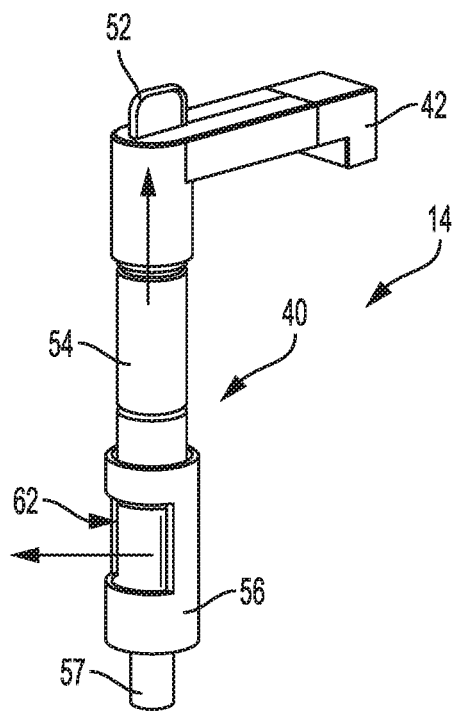
FIG. 4B is a top perspective view of the water discharge arrangement of FIG. 4A in a second configuration in accordance with an aspect of the disclosure.

Referring to FIG. 4B, water discharge arrangement 14 is shown in a first lifted position. To move to this first lifted position, the user may pull upward on tab 52, lifting discharge outlet 42 from a recessed seat (not shown) within cover 24, which simultaneously lifts top portion 54 of tube 40 upward, as well. Referring again to FIG. 4A, top portion 54 may include a shoulder or other structural feature which limits the amount of allowable upward travel of discharge outlet 42 and top portion 54, as shoulder may contact a bottom surface of cover 24, a corresponding shoulder surface within the bottom portion 56, etc.

As discharge outlet 42 is lifted to the position shown in FIG. 4B, the top portion 54 of tube 40 slides vertically upward with respect to bottom portion 56. When discharge outlet 42 is lifted upward, opening 62 creates a discontinuity in tube 40, thereby preventing water from flowing from bottom portion 56 to top portion 54 (and discharge outlet 42). Instead, the water is discharged out of opening 62 and, e.g., back into the clean water chamber 26 shown in FIGS. 1-3. In this way, water discharge from discharge outlet 42 may be stopped, but the operation of the pump may continue unabated.

Figure 4C:
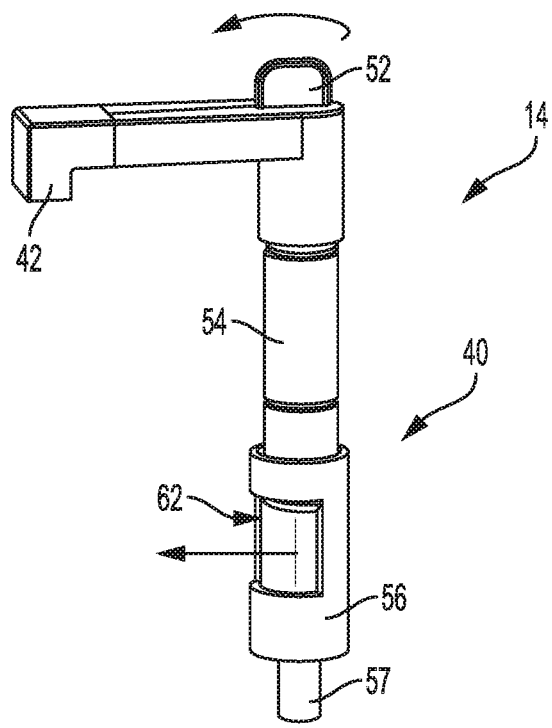
FIG. 4C is a top perspective view of the water discharge arrangement of FIG. 4A in a third configuration in accordance with an aspect of the disclosure.

Referring to FIG. 4C, discharge outlet 42 is shown in a rotated position, thereby moving the discharge direction of discharge outlet 42 from an internal direction (i.e., into the main water chamber of the aquarium) to an external direction (i.e., out of the aquarium). As described above with respect to FIG. 3, the discharge outlet 42 may be rotatable any appropriate amount (e.g., 90°, 180°, less than 180°, more than 180°, 360°, etc.), with the exact amount of rotation dependent upon the aquarium configuration, user preferences, etc. In the configuration shown in FIG. 4C, discharge outlet 42 is rotated while top portion 54 is still in an upward position, thereby maintaining the flow of water out of opening 62 and preventing water discharge from discharge outlet 42. Thus, the user is able to rotate discharge outlet 42 to the external direction shown in FIG. 4C without the need for the user to quickly collect any water being discharged and/or disable the pump.

Figure 4D:
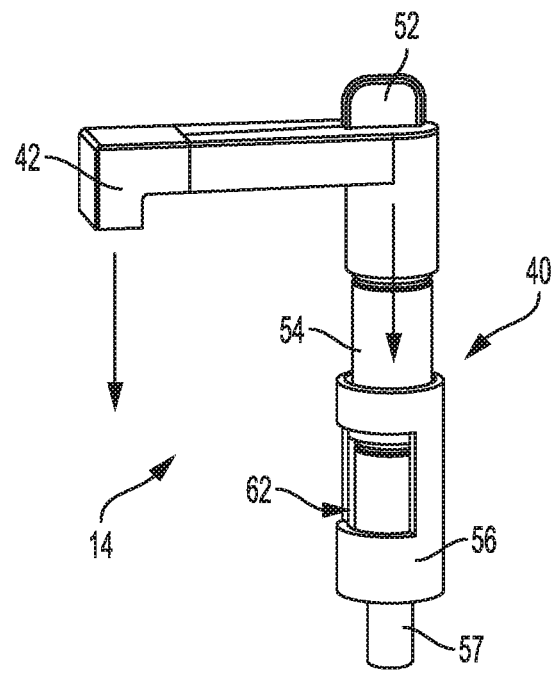
FIG. 4D is a top perspective view of the water discharge arrangement of FIG. 4A in a fourth configuration in accordance with an aspect of the disclosure.

FIG. 4D shows discharge outlet 42 pushed into a downward position, thereby blocking the opening 62 once again and reconnecting the flow of water between bottom portion 56 and top portion 54 of tube arrangement 40. In this downward position, water may once again flow to discharge outlet 42, thereby enabling the water to be discharged externally to the aquarium for collection in a separate container. Accordingly, water discharge arrangement 14 provides for a means to discharge some or all of the water from the aquarium utilizing an existing recirculation pump. As the water flow from discharge outlet 42 may be interrupted when moving the discharge outlet 42 from an internal direction to an external direction (and vice versa), the user can avoid messes and may be more precise in the amount of water removed from the aquarium.

Figure 5:
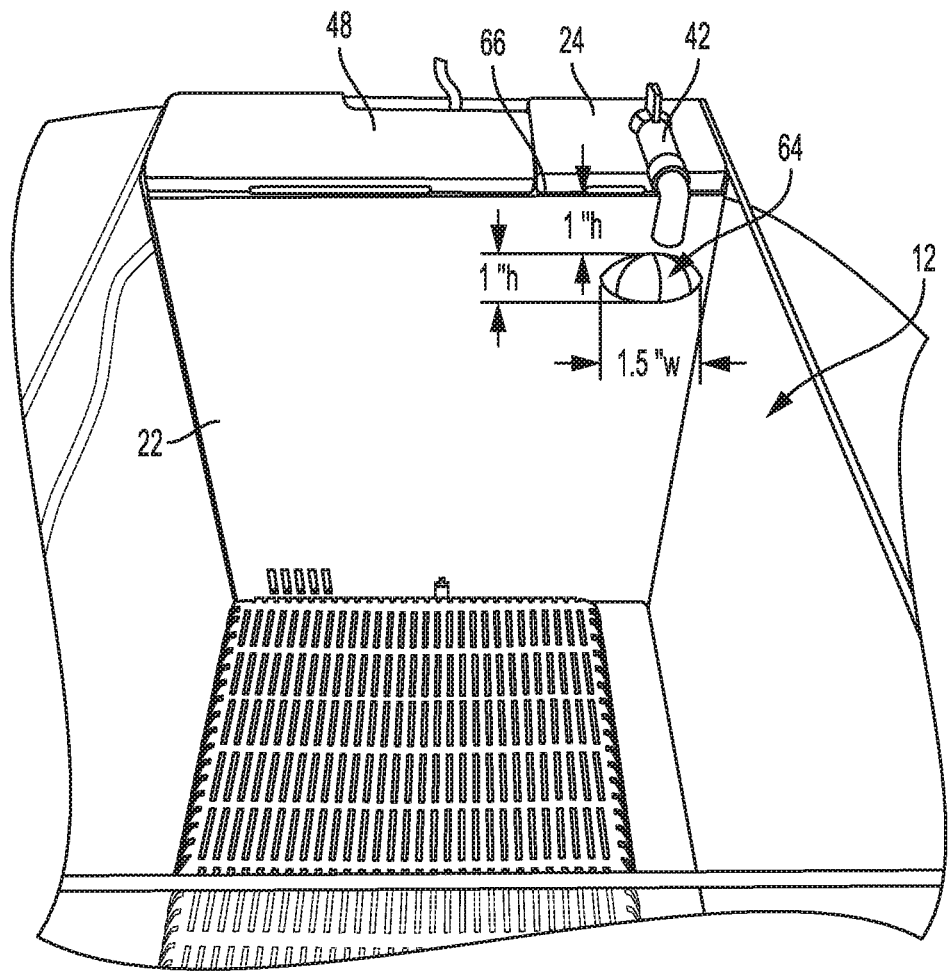
FIG. 5 is a top perspective view of an aquarium and splash guard in accordance with another aspect of the disclosure.
Figure 6:
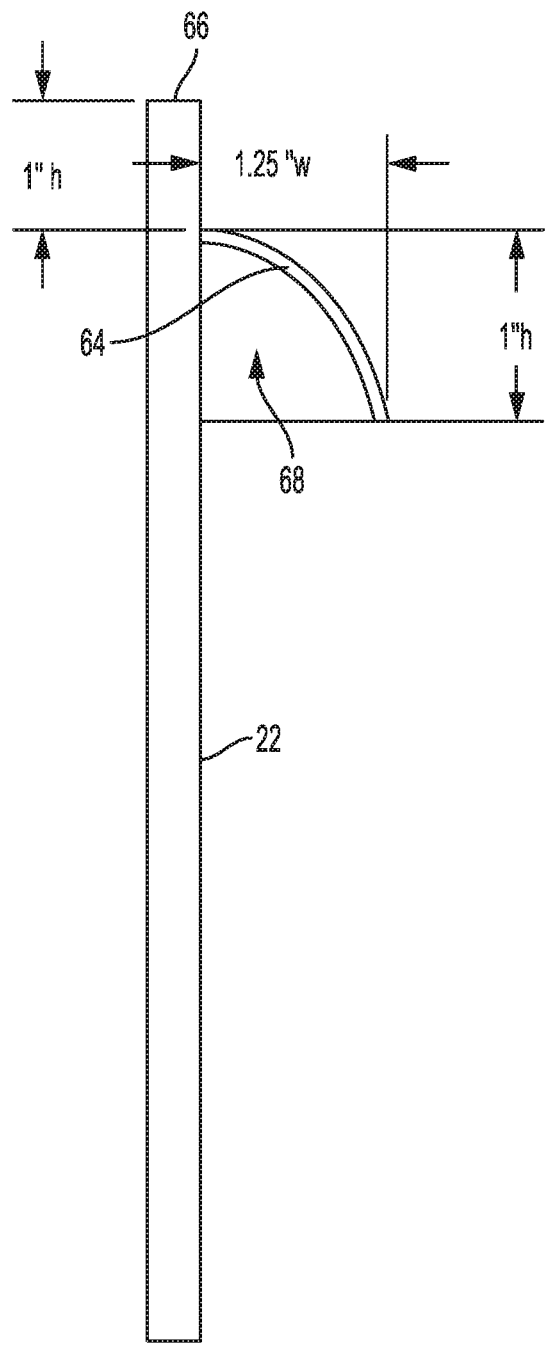
FIG. 6 is side cross-sectional view of the splash guard of FIG. 5.

Referring now to FIGS. 5-6, another aspect of the disclosure is illustrated. As shown in FIG. 5, discharge outlet 42 is configured to discharge water into a main water chamber 12 of the aquarium. Extending from inner sidewall 22 is a splash guard 64, which is positioned directly below the discharge outlet 42 such that water emitted from discharge outlet 42 contacts the splash guard 64 before entering the main water chamber 12. For example, as shown in FIG. 6, splash guard 64 may be positioned about 1 inch below a top surface 66 of inner sidewall 22, and may be formed in a "half dome" shape, with a hollow region 68 therebelow. With such a configuration, the water emitted from discharge outlet 42 may contact the splash guard 64 and be dissipated as it enters the main water chamber 12, which allows for a greater volume of water to be discharged from discharge outlet 42 without the concern for excess agitation and/or oxygenation within the main water chamber 12.

While splash guard 64 is shown in FIGS. 5-6 as being formed in a "half dome" shape, it is to be understood that splash guard 64 may take any appropriate shape and/or configuration. Additionally, the specific dimensions and placement of splash guard 64 shown in FIGS. 5-6 are merely examples and, thus, are not to be considered limiting to the disclosure.

Figure 7:
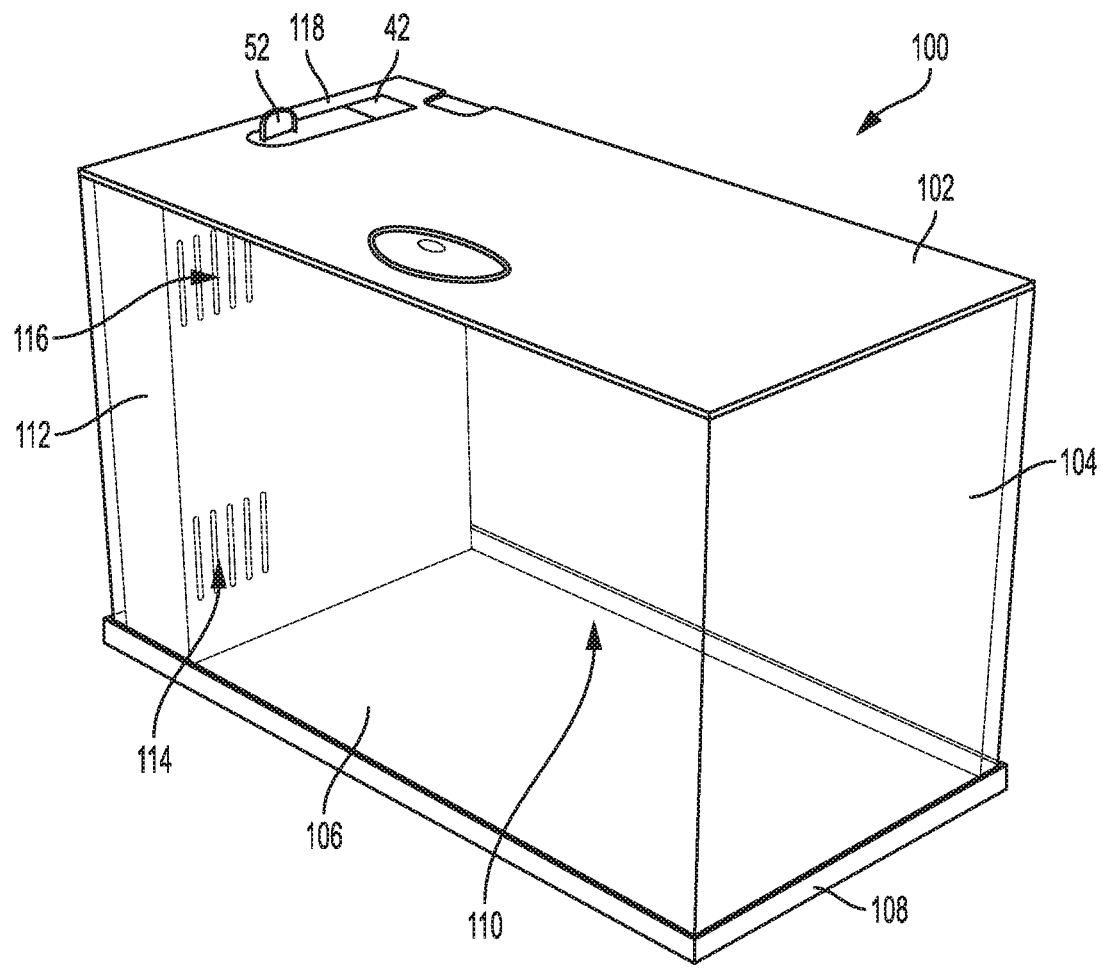
FIG. 7 is a front perspective view of an aquarium in accordance with another aspect of the disclosure.
Figure 8:
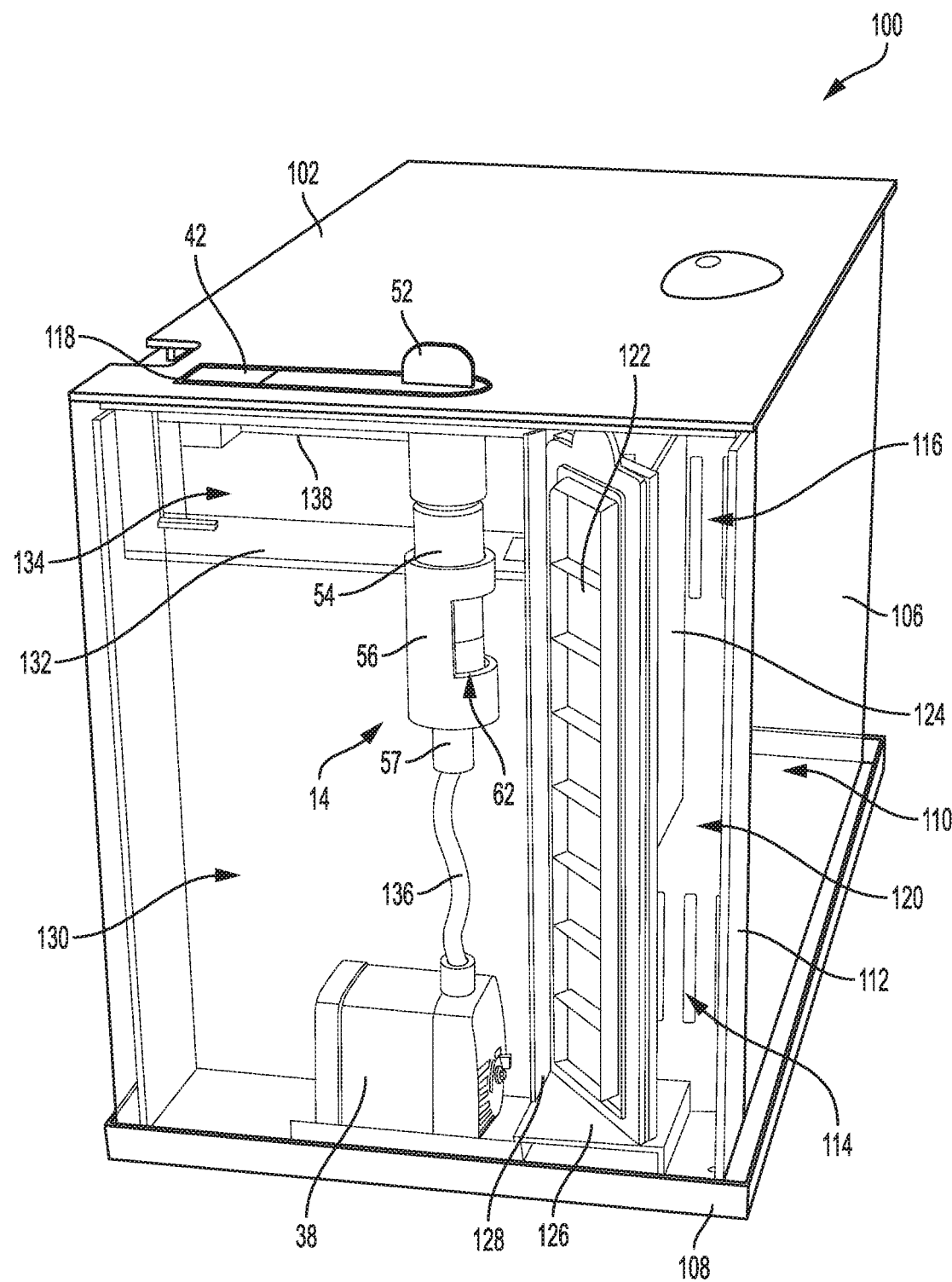
FIG. 8 is a partial side perspective view of a filtering and water discharge arrangement of the aquarium of FIG. 7.
Figure 9:
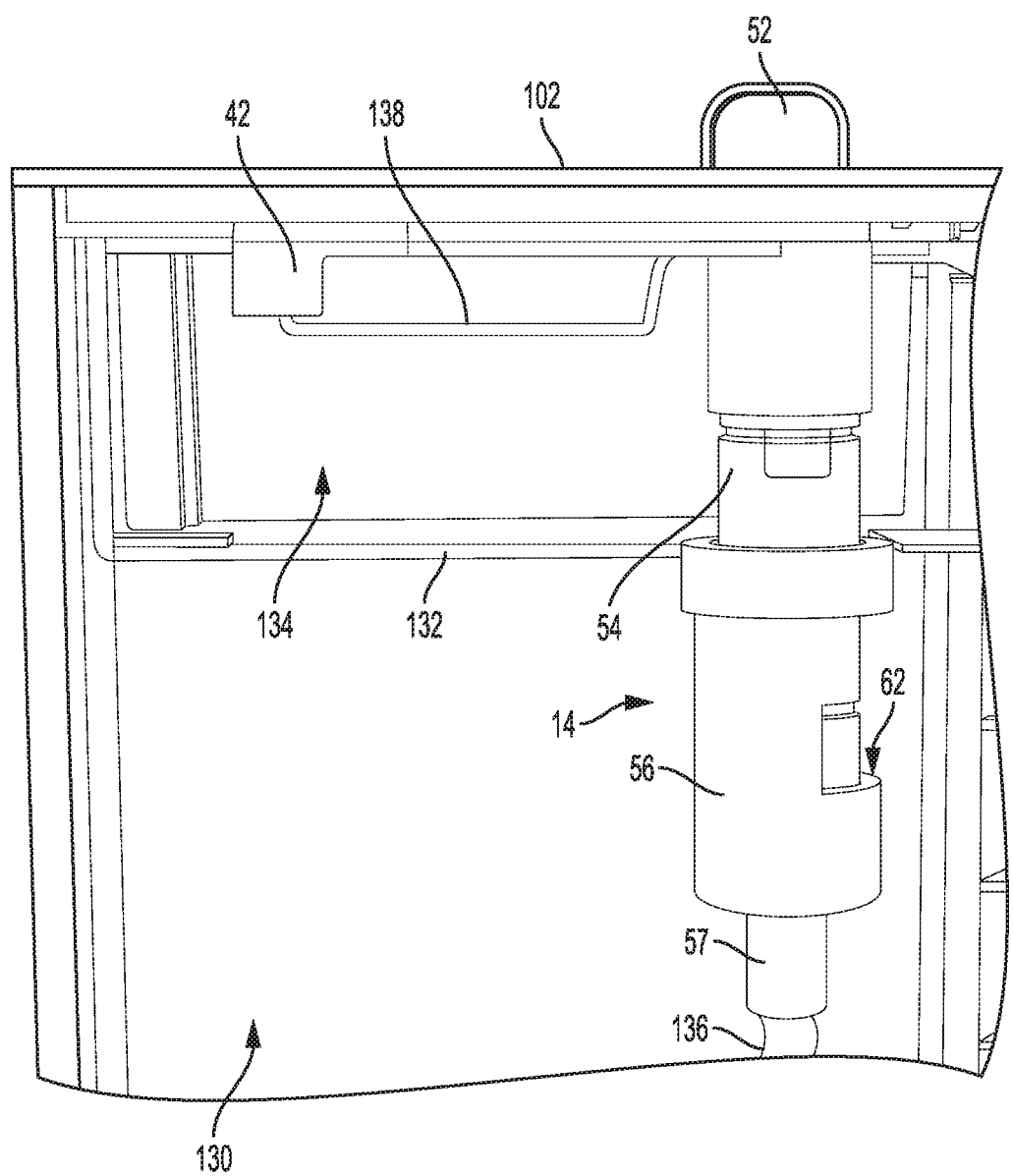
FIG. 9 is a partial side view of the water discharge arrangement of the aquarium of FIG. 7.

Next, referring to FIGS. 7-9, an aquarium 100 in accordance with another aspect of the disclosure is shown. Aquarium 100 may be, e.g., a 3-gallon capacity aquarium, but is not limited as such. As illustrated in FIG. 7, aquarium 100 includes a top cover 102, a pair of lateral sides 104, a pair of longitudinal sides 106, and a base 108. Like aquarium 10 described above, aquarium 100 is configured to provide a suitable living environment for one or more fish and/or other aquatic species. One of more of the lateral sides 104 and the longitudinal sides 106 are preferably clear, but may also be semi-transparent or translucent, and may be formed of glass or another suitable material such as, e.g., polycarbonate, acrylic, etc. Depending on the species housed within a main water chamber 110, the water may be either fresh water or salt water. While shown as being rectangular parallelpipedic in shape, it is to be understood that aquarium 100 may be configured in other shapes, e.g., cubic, cylindrical, semi-cylindrical, etc. Unlike aquarium 10 described above with respect to FIGS. 1-3, which includes a grate 30 and undergravel water chamber 32, aquarium 100 includes only a base 108, with no grate or gravel-based filtration through an undergravel water chamber.

Filtration housing 112 is located proximate to one of the lateral sides 104 of aquarium 100. As will be described in further detail below, filtration housing 112 is configured to provide for particulate filtration and recirculation of the water to/from the main water chamber 110. Referring to FIGS. 7-8, a portion of filtration housing 112 comprises a plurality of lower openings 114 and a corresponding plurality of upper openings 116. In the embodiment shown in FIGS. 7-8, lower openings 114 may be positioned at or slightly above a depth of gravel or another underlying medium (not shown) which the user may place on top of the base 108. The upper openings 116, in turn, may be positioned at a location proximate to the manufacturer's suggested maximum fill line for the aquarium 100. However, it is to understood that one or both of lower openings 114 and upper openings 116 may be sized or positioned differently than that which is shown in FIGS. 7-8.

Specifically referring to FIG. 8, filtration housing 112 includes a dirty water chamber 120, where water from within main water chamber 110 is drawn through one or both of lower openings 114 and upper openings 116 and into the dirty water chamber 120 by suction force of, e.g., pump 38, as is similarly described above with respect to FIGS. 1-3. In communication with and/or adjacent a portion of dirty water chamber 120, a filter 122 may be provided. Filter 122 may be any suitable aquatic filter, such as a tightly-woven screen, a porous media filter, etc. In some embodiments, filter 122 may be removable and/or replaceable. As shown in FIG. 8, filter 122 may be supported on a first side by a first interior wall 124, on a second side by a second interior wall 128, and on a bottom portion thereof by a lower platform 126. The placement and/or size of first interior wall 124, second interior wall 128, and lower platform 126 may be designed such that filter 122 is a conventional aquatic filter, thereby negating the need for a specialized filter to be utilized with aquarium 100. Additionally and/or alternatively, it is to be understood that the placement and/or size of first interior wall 124, second interior wall 128, and lower platform 126 is not limited to that which is shown in FIG. 8. Furthermore, filter 122 is shown as being positioned angularly relative to first interior wall 124 and second interior wall 128, with such angular positioning allowing for filtration housing 112 to be narrower in width, thereby providing for increased space within main water chamber 110 while still allowing water to pass through filter 122. However, it is to be understood that filter 122 may be positioned in other configurations such as, e.g., perpendicular to a lateral side 104 of the aquarium 100.

A clean water chamber 130 is provided opposite dirty water chamber 120 within filtration housing 112, with clean water chamber 130 and dirty water chamber 120 being in fluid communication with one another via filter 122. As described above, a pump 38 is provided within clean water chamber 130, with pump 38 being, e.g., a submersible pump capable of drawing water from the dirty water chamber 120 through the filter 122, thereby removing various impurities from the water in the process. Pump 38 is coupled to the water discharge arrangement 14 by way of a flexible hose 136, with water discharge arrangement 14 being substantially identical in construction to that described above with respect to FIGS. 4A-4D. Accordingly, the purposes and/or functions of specific features of water discharge arrangement 14 as shown in FIGS. 7-9 will not be reiterated herein.

In the configuration as shown in FIGS. 7-9, water discharge arrangement 14 is in a conventional water discharge configuration, similar to that which is described above with respect to FIG. 4A. Thus, as pump 38 pulls water through filter 122 from the dirty water chamber 120, water flows through the bottom portion 56 and top portion 54 of water discharge arrangement 14 for eventual discharge from discharge outlet 42, which is held flush within a recessed portion 118 of top cover 102. However, in the configuration shown in FIGS. 7-9, the water discharged from discharge outlet 42 does not recirculate directly to clean water chamber 130. Rather, the filtration housing 112 includes a smaller container 132 positioned within clean water chamber 130 and forming a recirculation chamber 134. When filtered water is discharged from discharge outlet 42 in the conventional water discharge configuration as shown, the water fills recirculation chamber 134, eventually nearing a top portion of the container 132. A recessed lip 138 is provided on a wall portion of filtration housing 112, thereby allowing the filtered water within recirculation chamber 134 to cascade over recessed lip 138 and back into the main water chamber 110. In this way, filtered water is continuously recirculated into main water chamber 110 in a controlled, non-agitating manner, without the need for, e.g., a splash guard or other feature to dissipate the force of the water discharged directly from the discharge outlet 42. However, it is to be understood that a splash guard or other feature could also be utilized in conjunction with filtration housing 112.

Additionally, container 132 may be configured to support at least a portion of water discharge arrangement 14. For example, as shown in FIGS. 8-9, bottom portion 56 of water discharge arrangement 14 passes through, and is supported by, a bottom surface of container 132. In this way, bottom portion 56 may remain stationary relative to container 132, while top portion 54 is capable of vertical displacement and rotation relative to bottom portion 56.

While not shown in FIGS. 7-9, water discharge arrangement 14 is configured to work similarly to the arrangement described above with respect to FIGS. 1-4D. That is, if the user lifts upward on tab 52, discharge outlet 42 is simultaneously lifted away from recessed portion 118 of top cover 102, and upper portion 54 is telescopically moved upward relative to lower portion 56. As described above with respect to FIG. 4B, this upward movement of upper portion 54 causes opening 62 to become unblocked, thereby preventing the water flowing from pump 38 through flexible tube 136 from travelling to upper portion 54 and discharge outlet 42. Instead, the water is discharged out of opening 62 and recirculated back into clean water chamber 130 of filtration housing 112. Then, the user may rotate the discharge outlet 42 (e.g., 90°) without water exiting the discharge outlet 42, yet with the pump 38 still operating to draw water to the water discharge arrangement 14. When the discharge outlet 42 is in a preferred position (i.e., above a collection container), the user may then press downward on the tab 52 and/or discharge outlet 42, thereby blocking the opening 62 and re-starting the flow of water from pump 38 to the discharge outlet 42 such that a desired amount of water can be removed from the aquarium 100 utilizing the existing recirculation and filtration componentry. When an appropriate amount of water has been removed, the user simply need lift up on tab 52 again to stop the water discharge, rotate the discharge outlet 42 back to its original position, and press down on tab 52 and/or discharge outlet 42 again to re-start the flow of water back into recirculation chamber 134. Throughout all of these movements of water discharge arrangement 14, the pump 38 continues to operate unabated.

Figure 10:
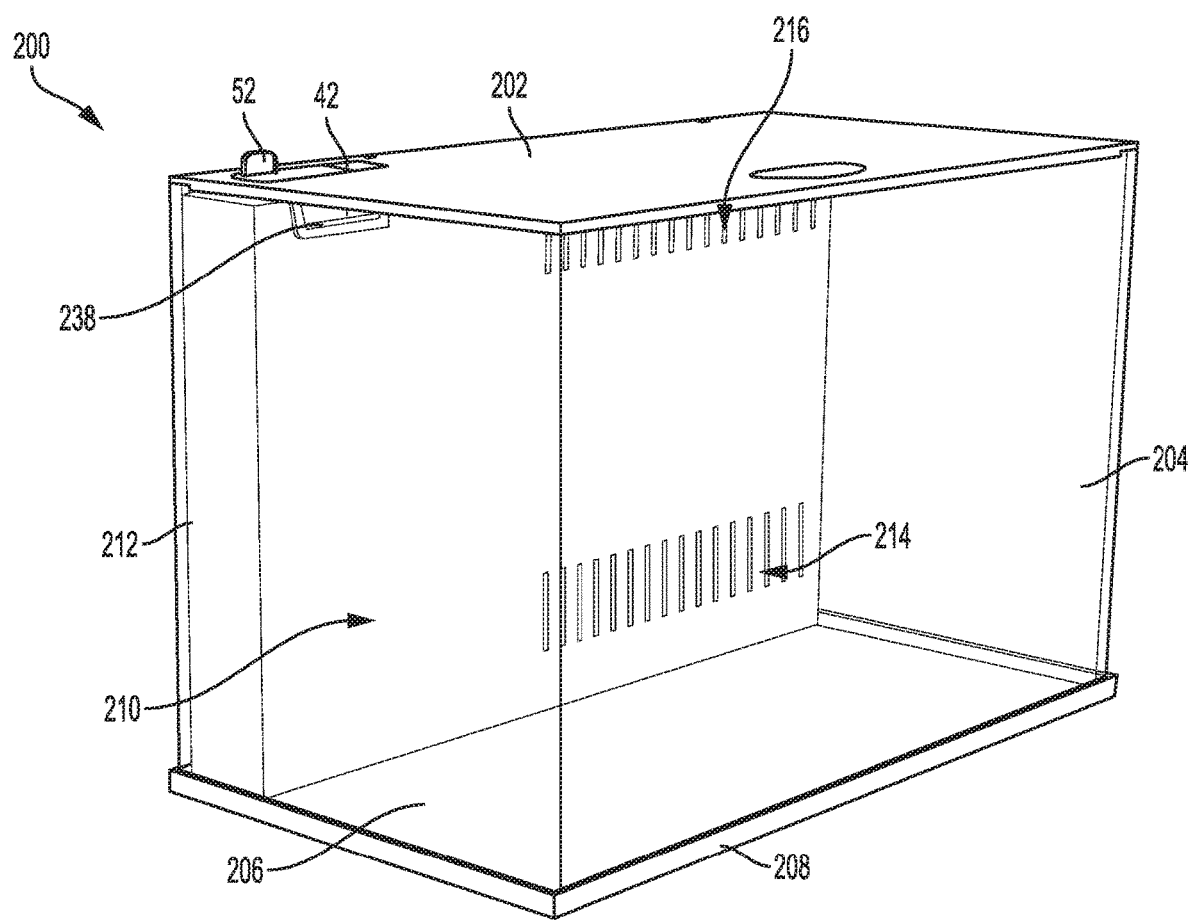
FIG. 10 is a front perspective view of an aquarium in accordance with another aspect of the disclosure.
Figure 11:
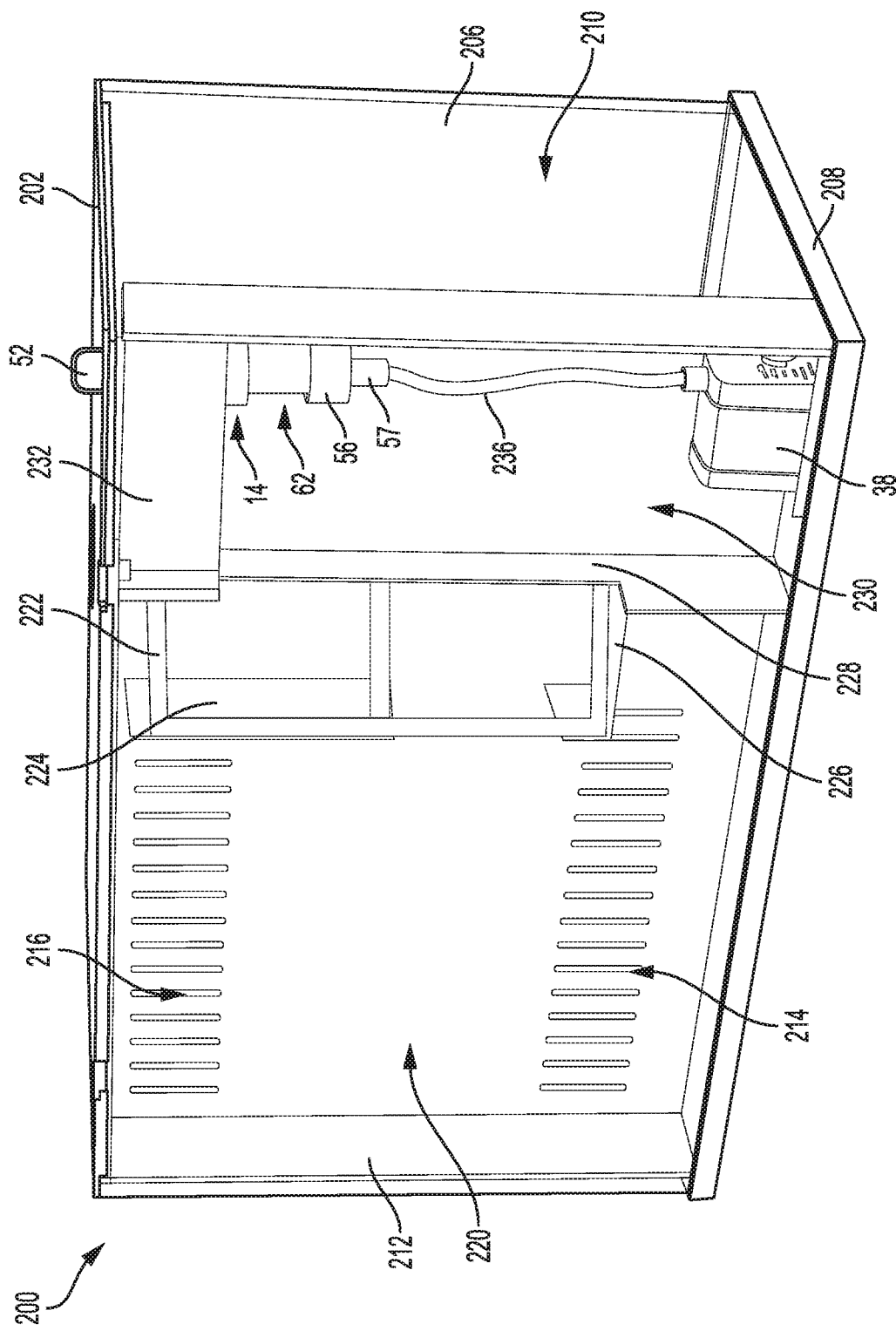
FIG. 11 is a partial rear perspective view of a filtering and water discharge arrangement of the aquarium of FIG. 10.
Figure 12:
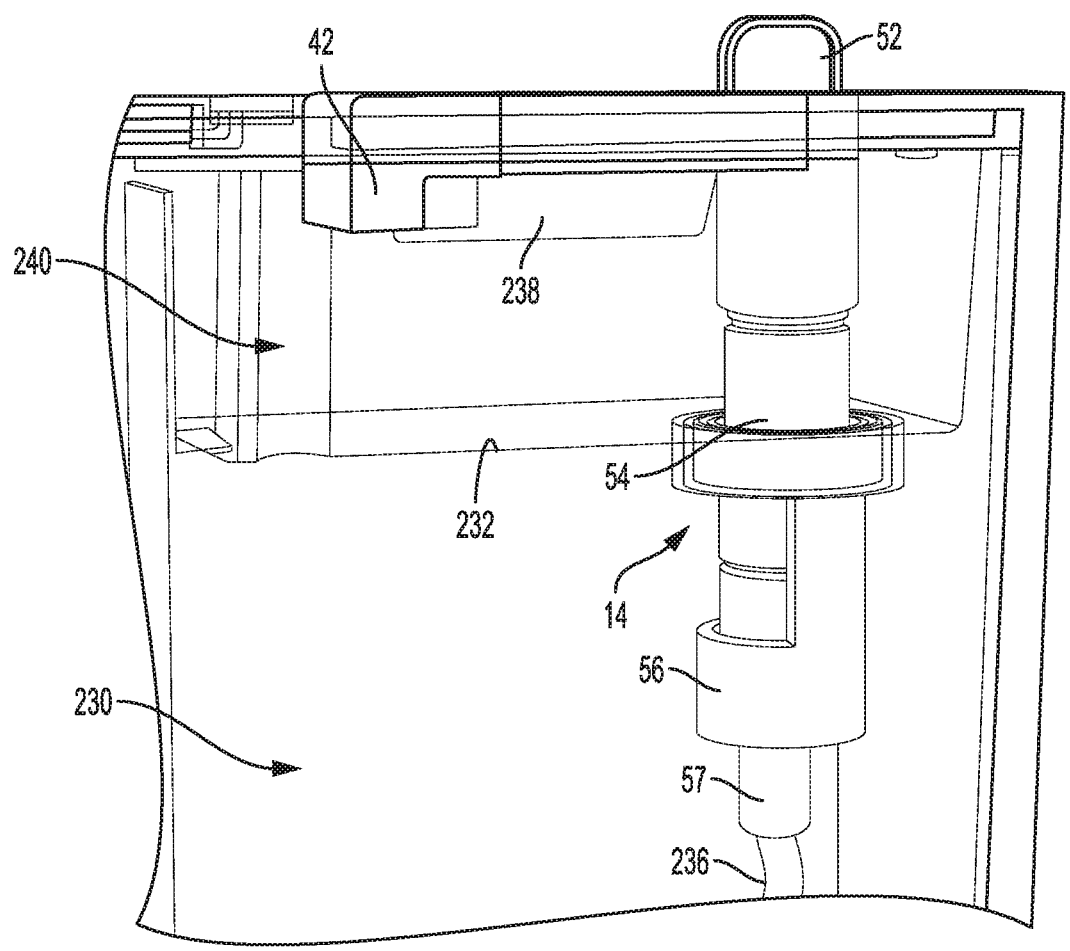
FIG. 12 is a partial rear view of the water discharge arrangement of the aquarium of FIG. 10.

Next, referring to FIGS. 10-12, an aquarium 200 in accordance with another aspect of the disclosure is shown. While aquarium 100 described above with respect to FIGS. 7-9 may be, e.g., a 3-gallon capacity aquarium, aquarium 200 may be larger (e.g., a 5-gallon capacity aquarium). As such, the placement and size of components within aquarium 200 may vary as compared to aquarium 100. As illustrated in FIG. 10, aquarium 200 includes a top cover 202, a pair of lateral sides 206, a pair of longitudinal sides 204, and a base 208. Like aquariums 10, 100 described above, aquarium 200 is configured to provide a suitable living environment for one or more fish and/or other aquatic species. One or more of the lateral sides 206 and the longitudinal sides 204 are preferably clear, but may also be semi-transparent or translucent, and may be formed of glass or another suitable material such as, e.g., polycarbonate, acrylic, etc. Depending on the species housed within a main water chamber 210, the water may be either fresh water or salt water. While shown as being rectangular parallelpipedic in shape, it is to be understood that aquarium 200 may be configured in other shapes, e.g., cubic, cylindrical, semi-cylindrical, etc.

Aquarium 200 also includes a filtration housing 212 is located proximate to a rear longitudinal side 204 of aquarium 200. With this placement of filtration housing 212, a user's view of main water chamber 210 is substantially unobstructed on three contiguous sides of the aquarium 200. Additionally, with filtration housing 212 being located proximate a longitudinal side 204, the size of the various chambers and openings of filtration housing 212 may be optimized, as will be described in further detail below.

Filtration housing 212 is configured to provide for particulate filtration and recirculation of the water to/from the main water chamber 210. Referring to FIGS. 10-11, a portion of filtration housing 212 comprises a plurality of lower openings 214 and a corresponding plurality of upper openings 216. Lower openings 214 may be positioned at or slightly above a depth of gravel or another underlying medium which the user may place on top of the base 208, while the upper openings 216 may be positioned at a location proximate to the manufacturer's suggested maximum fill line for the aquarium 200. As shown in FIG. 11, both lower openings 214 and upper openings 216 extend substantially across the length of a dirty water chamber 220, which will be described in further detail below. By having the numerous lower openings 214 and upper openings 216 extend across dirty water chamber 220 in such a manner, the pump 38 is able to draw water from the main water chamber 210 with less hydraulic restriction, thereby lessening the overall burden on the pump 38. However, it is to understood that one or both of lower openings 214 and upper openings 216 may be sized or positioned differently than that which is shown in FIGS. 10-11.

Referring still to FIG. 11, within or immediately adjacent a portion of dirty water chamber 220, a filter 222 may be provided. Filter 222 may be any suitable aquatic filter, such as a tightly-woven screen, a porous media filter, etc. In some embodiments, filter 222 may be removable and/or replaceable. Filter 222 may be supported on a first side by a first interior wall 224, on a second side by a second interior wall 228, and on a bottom portion thereof by a lower platform 226. The placement and/or size of first interior wall 224, second interior wall 228, and lower platform 226 may be designed such that filter 222 is a conventional aquatic filter, thereby negating the need for a specialized filter to be utilized with aquarium 200. Additionally and/or alternatively, it is to be understood that the placement and/or size of first interior wall 224, second interior wall 228, and lower platform 226 is not limited to that which is shown in FIG. 11. Furthermore, filter 222 is shown as being positioned angularly relative to first interior wall 224 and second interior wall 228, with such angular positioning allowing for filtration housing 212 to be narrower in width, thereby providing for increased space within main water chamber 210 while still allowing water to pass through filter 222. However, it is to be understood that filter 222 may be positioned in other configurations such as, e.g., perpendicular to a longitudinal side 204 of the aquarium 200.

A clean water chamber 230 is provided opposite dirty water chamber 220 within filtration housing 212. As described above, a pump 38 is provided within clean water chamber 230, with pump 38 being, e.g., a submersible pump capable of drawing water from the dirty water chamber 220 through the filter 222, thereby removing various impurities from the water in the process. Pump 38 is coupled to the water discharge arrangement 14 by way of, e.g., a flexible hose 236, with water discharge arrangement 14 being substantially identical in construction to that described above with respect to FIGS. 4A-4D. Accordingly, the purposes and/or functions of specific features of water discharge arrangement 14 as shown in FIGS. 10-12 will not be reiterated herein. Furthermore, it is to be understood that pump 38 may be coupled to water discharge arrangement 14 via couplings other than flexible hose 236, such as, e.g., a solid tube. However, by utilizing a flexible hose 236, the location of pump 38 in relation to water discharge arrangement 14 may slightly vary, while still remaining coupled thereto. Additionally, the use of a flexible hose 236 also allows for the same pump 38 and water discharge arrangement 14 to be used across multiple different aquarium sizes and/or filtration housing arrangements.

In the configuration as shown in FIGS. 10-12, water discharge arrangement 14 is in a conventional water discharge configuration, similar to that which is described above with respect to FIG. 4A. Thus, as pump 38 pulls water through filter 222 from the dirty water chamber 220, water flows through the bottom portion 56 and top portion 54 of water discharge arrangement 14 for eventual discharge from discharge outlet 42. However, in the configuration shown in FIGS. 10-12, the water discharged from discharge outlet 42 does not recirculate directly to clean water chamber 230. Rather, the filtration housing 212 includes a smaller container 232 forming a recirculation chamber 240. When filtered water is discharged from discharge outlet 42 in the conventional water discharge configuration as shown, the water fills recirculation chamber 240, eventually nearing a top portion of the container 232. A recessed lip 238 is provided on a wall portion of filtration housing 212, thereby allowing the filtered water within recirculation chamber 240 to cascade over recessed lip 238 and back into the main water chamber 210. In this way, filtered water is continuously recirculated into main water chamber 210 in a controlled, non-agitating manner, without the need for, e.g., a splash guard or other feature to dissipate the force of the water discharged directly from the discharge outlet 42. However, it is to be understood that a splash guard or other feature could also be utilized in conjunction with filtration housing 212. Furthermore, in an alternative embodiment, container 232 could be omitted, with the recirculated water discharged from discharge outlet 42 filling clean water chamber 230 until the water level reaches a point in which water cascades over recessed lip 238. Such a configuration, however, may increase the burden on the pump 38 as compared to a configuration utilizing container 232.

While not shown in FIGS. 10-12, water discharge arrangement 14 is configured to work similarly to the arrangement described above with respect to FIGS. 1-4D. That is, if the user lifts upward on tab 52, discharge outlet 42 is simultaneously lifted away from the top cover 202, and upper portion 54 is telescopically moved upward relative to lower portion 56. As described above with respect to FIG. 4B, this upward movement of upper portion 54 causes opening 62 to become unblocked, thereby preventing the water flowing from pump 38 through flexible tube 236 from travelling to upper portion 54 and discharge outlet 42. Instead, the water is discharged out of opening 62 and recirculated back into clean water chamber 230 of filtration housing 212. Then, the user may rotate the discharge outlet 42 (e.g., 180°) without water exiting the discharge outlet 42, yet with the pump 38 still operating to draw water to the water discharge arrangement 14. When the discharge outlet 42 is in a preferred position (i.e., above a collection container, a sink, etc.), the user may then press downward on the tab 52 and/or discharge outlet 42, thereby causing the upper portion 54 to again block the opening 62 and re-starting the flow of water from pump 38 to the discharge outlet 42 such that a desired amount of water can be removed from the aquarium 200 utilizing the existing recirculation and filtration componentry. When an appropriate amount of water has been removed, the user simply need lift up on tab 52 again to stop the water discharge, rotate the discharge outlet 42 back to its original position, and press down on tab 52 and/or discharge outlet 42 again to re-start the flow of water back into recirculation chamber 240. Throughout all of these movements of water discharge arrangement 14, the pump 38 continues to operate unabated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An aquarium comprising:
    a first water chamber providing a habitat for aquatic species;
    a second water chamber, wherein the second water chamber is fluidly coupled to the first water chamber;
    a third water chamber, wherein the third water chamber is fluidly coupled to the second water chamber; and
    a water discharge arrangement housed at least partially within the third water chamber, wherein the water discharge arrangement comprises a pump and a tube having a discharge outlet rotatably coupled to a distal end of a tube, the proximal end of the tube non-rotatably coupled to the pump such that water within the third water chamber may be discharged from the discharge outlet, and further wherein the discharge outlet is selectively rotatable such that water may be discharged either a) into one of the first water chamber or the third water chamber, or b) out of the aquarium.

2. The aquarium of claim 1, tube is a telescopic tube coupling the pump to the discharge outlet such that the discharge outlet is vertically displaceable relative to the pump.

3. The aquarium of claim 2, wherein the telescopic tube comprises a top portion and a bottom portion, the top portion having a smaller diameter than the bottom portion and being vertically displaceable and at least partially rotatable relative to the bottom portion.

4. The aquarium of claim 3, wherein the bottom portion comprises an opening formed therein such that upward vertical displacement of the top portion relative to the bottom portion fluidly disconnects the top portion the top portion from the bottom portion to prevent fluid flow from the pump to the discharge outlet.

5. The aquarium of claim 4, wherein the opening is configured to allow fluid flow from the bottom portion to the third water chamber when the top portion is displaced upwardly relative to the bottom portion.

6. The aquarium of claim 1, wherein the discharge outlet further comprises a graspable tab extending from a top surface of the discharge outlet.

7. The aquarium of claim 1, further comprising a top cover.

8. The aquarium of claim 7, wherein the top cover comprises a recessed seat formed therein, the recessed seat configured to support at least a portion of the discharge outlet when the discharge outlet is rotated such that water is discharged into one of the first water chamber and the third water chamber.

9. The aquarium of claim 1, further comprising a removable filter.

10. The aquarium of claim 9, wherein the removable filter is positioned between the second water chamber and the third water chamber to enable fluid transfer between the second water chamber and the third water chamber.

11. The aquarium of claim 10, wherein the removable filter is positioned angularly between the second water chamber and the third water chamber.

12. The aquarium of claim 1, wherein the second water chamber and the third water chamber are formed within a filtration housing separate from the first water chamber.

13. The aquarium of claim 12, wherein the third water chamber further comprises a secondary container, wherein the secondary container is configured to collect water discharged from the discharge outlet.

14. The aquarium of claim 13, wherein the filtration housing further comprises a recessed lip positioned proximate the secondary container, wherein the recessed lip is configured to enable fluid flow between the third water chamber and the first water chamber.

15. The aquarium of claim 12, wherein the filtration housing comprises a plurality of openings formed therein, the plurality of openings configured to provide fluid communication between the first water chamber and the second water chamber.

16. The aquarium of claim 1, further comprising a grate separating the first water chamber and the second water chamber.

17. The aquarium of claim 16, wherein the grate is configured to support a layer of gravel thereon.

18. A method of removing water from an aquarium, the method comprising:
    providing an aquarium having a first water chamber, a second water chamber fluidly coupled to the first water chamber, and a third water chamber fluidly coupled to the second water chamber;
    providing a water discharge arrangement at least partially within the third water chamber, wherein the water discharge arrangement comprises:
      a pump, a tube having a proximal end and a distal end, and
      a discharge outlet rotatably coupled to the distal end of the tube, the proximal end of the tube non-rotatably coupled to the pump such that water within the third water chamber may discharged from the discharge outlet; and
    rotating the discharge outlet from a first position in which the discharge outlet discharges water into one of the first water chamber and the third water chamber to a second position in which the discharge outlet discharges water out of the aquarium.

19. The method of claim 18, further comprising lifting the discharge outlet upward prior to rotation the discharge outlet from the first position to the second position.

20. The method of claim 19, wherein lifting the discharge outlet upward acts to interrupt the flow of water from the discharge outlet.

21. An aquarium comprising:
    a first water chamber providing a habitat for aquatic species;
    a second water chamber, wherein the second water chamber is fluidly coupled to the first water chamber;
    a third water chamber, wherein the third water chamber is fluidly coupled to the second water chamber; and
    a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium, wherein the water discharge arrangement further comprises a telescopic tube coupling the pump to the discharge outlet such that the discharge outlet is vertically displaceable relative to the pump.

22. An aquarium comprising:
    a first water chamber providing a habitat for aquatic species;
    a second water chamber, wherein the second water chamber is fluidly coupled to the first water chamber;
    a third water chamber, wherein the third water chamber is fluidly coupled to the second water chamber;
    a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium; and
    a top cover having a recessed seat formed therein, the recessed seat configured to support at least a portion of the discharge outlet when the discharge outlet is rotated such that water is discharged into one of the first water chamber and the third water chamber.

23. An aquarium comprising:
    a first water chamber providing a habitat for aquatic species;
    a second water chamber, wherein the second water chamber is fluidly coupled to the first water chamber;
    a third water chamber, wherein the third water chamber is fluidly coupled to the second water chamber; and
    a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium, wherein the second water chamber and the third water chamber are formed within a filtration housing separate from the first water chamber, and further wherein the third water chamber further comprises a secondary container, wherein the secondary container is configured to collect water discharged from the discharge outlet.

24. An aquarium comprising:
    a first water chamber providing a habitat for aquatic species;
    a second water chamber, wherein the second water chamber is fluidly coupled to the first water chamber;
    a third water chamber, wherein the third water chamber is fluidly coupled to the second water chamber; and
    a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium, wherein the second water chamber and the third water chamber are formed within a filtration housing separate from the first water chamber, and further wherein the filtration housing comprises a plurality of openings formed therein, the plurality of openings configured to provide fluid communication between the first water chamber and the second water chamber.

25. An aquarium comprising:
a first water chamber providing a habitat for aquatic species;
a second water chamber, wherein the second water chamber is fluidly coupled to the first water chamber;
a third water chamber, wherein the third water chamber is fluidly coupled to the second water chamber;
a grate separating the first water chamber and the second water chamber; and
a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium.

26. An aquarium comprising:
a first water chamber providing a habitat for aquatic species;
a second water chamber, wherein the second water chamber is fluidly coupled to the first water chamber;
a third water chamber, wherein the third water chamber is fluidly coupled to the second water chamber;
a grate separating the first water chamber and the second water chamber, the grate configured to support a layer of gravel thereon; and
a water discharge arrangement housed at least partially within the third water chamber, wherein the water discharge arrangement comprises a pump and a discharge outlet coupled to the pump such that water within the third water chamber may be discharged from the discharge outlet, and further wherein the discharge outlet is selectively rotatable such that water may be discharged either a) into one of the first water chamber or the third water chamber, or b) out of the aquarium.

27. A method of removing water from an aquarium, the method comprising:
providing an aquarium having a first water chamber, a second water chamber fluidly coupled to the first water chamber, and a third water chamber fluidly coupled to the second water chamber;
providing a water discharge arrangement at least partially within the third water chamber, wherein the water discharge arrangement comprises:
a pump, and
a discharge outlet coupled to the pump such that water within the third water chamber may discharged from the discharge outlet; and
rotating the discharge outlet from a first position in which the discharge outlet discharges water into one of the first water chamber and the third water chamber to a second position in which the discharge outlet discharges water out of the aquarium, wherein prior to rotating the discharge outlet from the first position to the second position the discharge outlet is lifted upward.

28. A method of removing water from an aquarium, the method comprising:
providing an aquarium having a first water chamber, a second water chamber fluidly coupled to the first water chamber, and a third water chamber fluidly coupled to the second water chamber;
providing a water discharge arrangement at least partially within the third water chamber, wherein the water discharge arrangement comprises:
a pump, and
a discharge outlet coupled to the pump such that water within the third water chamber may discharged from the discharge outlet; and
rotating the discharge outlet from a first position in which the discharge outlet discharges water into one of the first water chamber and the third water chamber to a second position in which the discharge outlet discharges water out of the aquarium, wherein prior to rotating the discharge outlet from the first position to the second position the discharge outlet is lifted upward, wherein lifting the discharge outlet upward acts to interrupt the flow of water from the discharge outlet.

* * * * *